United States Patent
Pizzato et al.

(10) Patent No.: US 10,240,719 B2
(45) Date of Patent: Mar. 26, 2019

(54) SAFETY SWITCH WITH LOCK-OUT DEVICE

(71) Applicant: Pizzato Elettrica S.R.L., Marostica (VI) (IT)

(72) Inventors: Marco Pizzato, Marostica (IT); Simone Zonta, Bassano Del Grappa (IT)

(*) Notice: Subject to any disclaimer, the term of this patent is extended or adjusted under 35 U.S.C. 154(b) by 141 days.

(21) Appl. No.: 15/302,169

(22) PCT Filed: Apr. 10, 2015

(86) PCT No.: PCT/IB2015/052623
§ 371 (c)(1),
(2) Date: Oct. 6, 2016

(87) PCT Pub. No.: WO2015/155744
PCT Pub. Date: Oct. 15, 2015

(65) Prior Publication Data
US 2017/0336026 A1    Nov. 23, 2017

(30) Foreign Application Priority Data
Apr. 11, 2014  (IT) .............................. VI2014A00104

(51) Int. Cl.
*H01H 27/00*  (2006.01)
*F16P 3/08*  (2006.01)

(52) U.S. Cl.
CPC ............. *F16P 3/08* (2013.01); *H01H 27/007* (2013.01); *H01H 2300/032* (2013.01); *Y02B 90/224* (2013.01); *Y04S 20/14* (2013.01)

(58) Field of Classification Search
CPC ... F16P 3/08; H01H 27/007; H01H 2300/032; H01H 3/163; H01H 3/20
USPC ............ 200/334, 61.62, 61.64, 43.11, 43.15, 200/43.16
See application file for complete search history.

(56) References Cited

U.S. PATENT DOCUMENTS

| | | | | |
|---|---|---|---|---|
| 5,868,243 A | * | 2/1999 | Bachle ................. | H01H 27/002 200/17 R |
| 6,696,652 B1 | * | 2/2004 | Spies ..................... | E05B 77/12 200/330 |
| 7,446,273 B2 | * | 11/2008 | Sukarukoff ........... | H01H 3/163 200/61.62 |

* cited by examiner

*Primary Examiner* — Edwin A. Leon
(74) *Attorney, Agent, or Firm* — Pathsegen IP LLC; Mosche Pinchas (57) ABSTRACT

A safety switch with a lock-out device including a switching unit, switching elements and actuating elements. The switching elements and the actuating elements are electronic and are respectively associated with a first communication element and a second communication element adapted to remote communicating therebetween by a signal and to allow the switching elements to discriminate the presence of an operating unit close to the switching unit. The switching unit includes a movable guard having a shielding element adapted to interpose itself between the communication elements when the guard is into the active position to avoid the transmission of the signal and the closing of the switching elements.

12 Claims, 10 Drawing Sheets

SAFETY SWITCH WITH LOCK-OUT DEVICE

TECHNICAL FIELD

The present invention finds application in the field of electric safety devices and in particular relates to a safety switch with lock-out device designed to be applied to perimeter protection structures for industrial machines or plants.

STATE OF THE ART

As known, the perimeter protection structures for industrial plants or machines have to be properly controlled in order to prevent access inside the perimeter when the machine or plant is working and avoid that the machine or plant may be inadvertently actuated in unsafe conditions, for example with workers still within the perimeter.

To this end, the perimeter protection structures are suitably equipped, at certain accesses, of one or more safety switches connected to the plant and designed to interrupt the power supply upon opening of the controlled access.

These switches should also be configured to avoid any further dangerous situation that might possibly be determined due to inadvertent behavior of personnel or to anomalous events.

Generally, the above switches comprise a switching unit anchored to the fixed part of the protection structure and housing the electrical contacts connected to the supply circuit of the plant, as well as any further electrical circuits to be connected to auxiliary signaling, emergency or control systems of the main plant.

An operating unit is in turn placed on the movable part of the structure to cooperate with the switching unit to determine the opening/closing of the main power circuit following opening/closing of the corresponding access.

In this way, the operation of the system is made possible only when the protective structure is in the safe condition of closed access, in which there is interaction between the switching unit and the operating unit.

The more common switches are of electromechanical type and provide an operating unit is having an actuator designed to mechanically interact with the electrical contacts housed in the switching unit through a suitable slot provided therein.

Some of these switches are also provided with a particular auxiliary safety device, commonly called "lock-out", whose main task is to obstruct the slot to prevent the actuator can interact with the contacts following inadvertent or inopportune actions, being able to close the circuit in unsafe conditions.

The lock-out devices are generally designed to be locked in the safety position, i.e. the one into which they obstruct the slot, to avoid that they can be removed by unauthorized persons.

Typically, the lock-out devices comprise a flap or movable partition mounted on the switching unit or close thereto, in correspondence of the slot, so that it can be brought from an inactive position in which the slot is free to an active position in which the slot is obstructed.

The locking of the door is usually obtained by applying one or more locks which prevent the reverse movement towards the inactive position.

An example of such a switch is the one marketed by Satech Safety Technology with code AZM200, in which the lock-out device comprises a guard fixed to a bracket upperly mounted on the switching unit and sliding vertically on a fixed guide to move the guard from a raised inactive position to a lowered active position.

The locking of the lock-out by means of one or more locks is made possible by the presence of a plurality of holes formed on the bracket and adapted to be aligned with corresponding holes provided on the fixed guide.

A further safety switch with lock-out device is described in EP2112674, in the name of the same Applicant, in which the lock-out device is defined by a small panel movable in rotation between a first position in which the access to the slot for the actuator is free and a second position wherein the slot is obstructed.

In addition, the small panel is provided with a plurality of holes adapted to be aligned with corresponding holes provided on a fixed support which the panel is bound to, in such a way to position corresponding locks blocking its movement.

In this way, the operator who have to enter the perimeter after having opened the access of the protection structure may simply bring the lock-out device in the occlusion position of the slot and lock it through one or more locks, preventing that there may be accidental closure of the protection.

Another type of safety switches provides that there is no longer an actuator of the mechanical type but on the contrary it uses remote switching systems of the electronic type, for example through Tag/RFID devices placed both in the switching unit and in the operating unit for generating a presence signal adapted to discriminate the opening and the closure of the access of the perimeter protection structure.

These switches allow to avoid some known drawbacks in terms of reliability and safety of the mechanically actuated switches.

From U.S. Pat. No. 7,446,273 a similar safety switch is known, which has a switching unit with an antenna adapted to receive a presence signal sent from an RFID device coupled to the operating unit. The switch is also provided with a lock-out device adapted to prevent, when inserted, the interaction between the switching unit and the drive unit.

In particular, the lock-out device is defined by a bracket placed above the switching unit to automatically slide thereon upon the opening of the access. The sliding bracket is also provided with a series of holes adapted to be aligned with corresponding holes on a fixed part of the switching unit to have corresponding locks for locking the bracket in the active condition.

In turn, the operating unit has a fixed C-shaped bracket arranged in such a way that in the event of accidental closing of the access, the switching unit and the driving unit are kept at a distance sufficient to avoid their mutual interaction.

Therefore, the protection action exerted by the two brackets is entrusted exclusively to the fact that the two units are kept spaced apart, but does not guarantee complete shielding of the switching unit in every situation.

As a consequence, this known switch does not prevent that there may be potential situations wherein there may still be communication between the two elements, even in a situation of open access.

Furthermore, the two brackets are so arranged that when the lock-out device is inserted the door is slightly open. Consequently, this condition does not makes the switch suitable for applications where it is necessary that the protection will remain closed even in the condition of the stopped plant, such as for example for refrigerators or other situations wherein it is important to preserve the environmental conditions inside the protected perimeter.

A further drawback is represented by the lack of modularity of the switch, whose configuration is such as to require different modes of mounting according to the type of closing of the door to which the switch is designed.

Still a further drawback, common to the known solutions of both the mechanical and electronic operating type, including those previously described, is represented by the fact that the positioning of the holes for the insertion of the locks is such that the latter can be inserted even when the lock-out device is not inserted or is inserted in only partially, so that it would be prevented from passing in the safe active position.

SCOPE OF THE INVENTION

The object of the present invention is to overcome the above drawbacks, by providing a safety switch with lock-out device which is high efficient and relatively cost-effective.

A particular object is to provide a safety switch with lock-out device that ensures safe operation in any working condition and whatever the relative position of the switching and operating units Still another object is to provide a safety switch with lock-out device wherein it is not possible to lock in a involuntary manner the passage of the lock-out device from the inactive position to the active one following the opening of the access controlled by the switch.

Still another object is to provide a safety switch with lock-out device wherein the lock-out device may only be locked in the active position and not in the inactive position or in any intermediate position.

A further object is to provide a safety switch with lock-out device with high modularity and reconfigurability to be used both on doors with right closure and left closure, either of the hinged type or sliding type, without being necessary to vary the mounting of the switch.

Not least object of the present invention is to provide a safety switch with lock-out device which allows the closure of the protection even with the lock-out inserted, preventing in any case the reactivation of the system, and thus be used in applications for which it is important to have always the protection closed.

These objects, and others which will appear more clearly hereinafter, are achieved by a safety switch with lock-out device which, according to claim 1, comprises a switching unit adapted to be anchored to a fixed part of a perimeter protection structure and provided with switching means adapted to be operatively connected at least to the power supply circuit of a plant to be controlled for the opening/closing thereof, an operating unit adapted to be anchored to a movable part of the structure and having actuating means adapted to interact with said switching means upon closing of the movable part on the fixed part to enable the closure of the power supply circuit, a lock-out device associated with said switching unit and having a guard movable between an inactive position adapted to allow the interaction between said switching means and said actuating means and an active position in which said interaction is prevented.

The switching means and the actuating means are of the electronic type and are respectively associated to a first and to a second communication element adapted to remote communicate therebetween by means of a presence signal and to allow said switching means to discriminate the presence of said drive unit in proximity of said switching unit.

According to a peculiar feature of the invention said movable guard comprises a shielding element adapted to be interposed between said communication elements when said guard is in said active position for avoiding the passage of said signal and prevent the closure of said switching means.

Furthermore, said drive unit is designed to allow said first and said second communication element to move in a position substantially facing with each other when said movable guard is both in said active position and in said inactive position.

Thanks to this combination of features, the lock-out device, besides being able to be effectively used also with safety switches of advanced type, i.e. with actuators of electronic type lacking the classical mechanical actuators, such as a key or the like, in specific configurations will allow to close the access to be controlled even when the movable guard is in the active position.

Advantageously, said shielding element may be shaped to surround said first communication element on at least three sides, so as to ensure its effectiveness whatever the relative position between the switching unit and the operating unit.

Suitably, the lock-out device may comprise a support adapted to be mounted upperly to said switching units and having guide means for said movable guard between said inactive position and said active position.

Moreover, said lock-out device may also comprise means for locking said movable guard adapted to prevent them from returning from said active position to said inactive position and wherein at least one between said movable guard and said support comprises one or more holes or passages for inserting corresponding locking means.

Advantageously, said holes may be arranged in such a way as to be accessible by said locking means only when said movable guard is in said active position and being at least partially obstructed when said movable guard is in said inactive position or in any intermediate position between said inactive position and said active position.

In this way the accidental reset of the inactive position for the protection may be prevented in unsafe situations, such as for example in case of presence of an operator within the controlled perimeter, as it will be sufficient that the operator entering the perimeter inserts the locking means after activating the protection.

At the same time it will prevent that the locking means may be inserted with the lock-out device in the inactive position or in any intermediate position along the stroke of the device, thus preventing the intervention.

The first and the second communication elements will be adapted to communicate therebetween only after reaching a predetermined minimum distance at which the first communication element will be able to discriminate the presence of the operating unit close to the switching unit.

The above value of the minimum distance adapted to be discriminated will be chosen in a predetermined range within which the protection may be deemed safely closed.

Suitably, the lock-out device may be designed to allow said operating unit to place said second communication element at said minimum distance from said first communication element also with said movable guard in said active position.

In this way, even when the lock-out device is inserted and possibly locked the protection will remain closed, while not being permitted the activation of the plant, this being particularly useful in those applications where it is necessary to preserve the environmental conditions inside the protected perimeter, such as in the case of refrigerators and the like.

To this end, the lock-out device may comprise holding means of said movable guard associated with said lock-out device and adapted to act selectively on the guard to hold it in said inactive position or allow it to move towards said active position.

In a particular configuration the holding means will be adapted to allow said actuating means to bring said second communication element in a same position substantially facing said first communication element both when said movable guard is in said active position and when it is in said inactive position.

According to a particular configuration, the switch may comprise centering means adapted to allow an at least partial alignment between said first and said second communication elements at the time of closure of the access of the protection structure, so as to ensure the correct positioning between the two communication elements also in the presence of relatively large misalignments in the assembly between the two units.

Preferably, said switching unit may comprise a lower case defining a longitudinal axis and housing said switching means and a head housing said first communication element and mounted on said case, susceptible of rotating around an axis of rotation substantially parallel to said longitudinal axis to angularly orient said first communication element.

In this way, one and the same switch can be used both on doors with right opening and doors with left opening, either of the type hinged or sliding type, simply modifying the relative orientation between the head and the case and without it being necessary to provide for its disassembly and without that for each application is required to adopt specific mounting mode.

On the contrary, the switch may be mounted always in the same way irrespective of the method of closing the protection, with the only attention to the relative angular orientation of the head.

At the same time, said movable guard may be longitudinally slidable between a raised inactive position and a lowered active position in which said shielding element covers substantially completely at least three sides of the peripheral wall of said head, so as to exert its action whatever the relative orientation between the switching unit and the operating unit, generally depending on the mode of closure of the access of the protection structure. Advantageous embodiments of the invention are obtained according to the dependent claims.

BRIEF DESCRIPTION OF THE DRAWINGS

Further features and advantages of the invention will become more apparent in light of the detailed description of some preferred but not exclusive embodiments of a safety switch with lock-out device, illustrated by way of non-limiting example with the aid of the accompanying drawing, in which.

BEST MODES OF CARRYING OUT THE INVENTION

With reference to the attached figures some preferred but not exclusive embodiment of a safety switch with lock-out device according to the invention are shown, which embodiments being intended to be applied, in a preferred but not exclusive way, to a perimeter protection structure, such as a barrier or movable panel, adapted to prevent unsafe access to a machine or industrial plant in operation inside a security perimeter.

In known manner, the switch will be designed to be applied to the protection structure in correspondence of an access thereof to allow the starting of the system only with the access in closed condition and to stop in a substantially immediate way the operation of the machine or plant in case of opening of a door or closure panel of such access.

Figure 1:
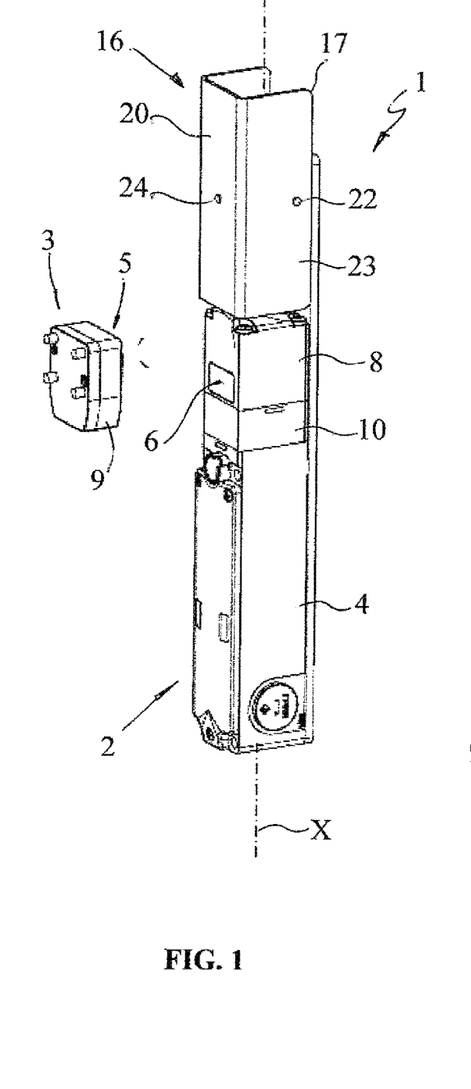
FIG. 1 is a perspective view of a switch of the invention in a first preferred embodiment and in condition of protection structure opened and lock-device in inactive position.

FIG. 1 shows a first embodiment of the safety switch, generally indicated by 1, which essentially comprises a switching unit 2 adapted to be anchored to the fixed part of the structure and an operating unit 3 adapted to be anchored to the movable part of the structure. In a known manner the switching unit 2 comprises a box-shaped case 4 defining a longitudinal axis X and housing thereinside switching means adapted to be operatively connected to the power supply circuit of the system to be controlled for the opening/closing thereof and possibly to one or more further control and/or service circuits of the plant for controlling thereof.

The switching means are not visible from the annexed figures as being of the known type and may be designed according to any of the typical ways for this type of switches, without particular limitations.

In turn, the operating unit 3 comprises actuating means 5 adapted to interact with the switching means upon closing of the movable part on the fixed part to enable the closure of the power supply circuit and thus determine the opening of this circuit upon the opening of the access.

In particular, both the actuating means 5 and the switching means will be of the electronic or electromechanical type, with the latter that will be preferably provided with a logic control unit with a microprocessor, for example an electronic cardboard.

The logic unit will be appropriately wired via a terminal block to the power supply circuit of the plant and optionally to one or more additional control and/or service circuits of the plant to be controlled, so as to switch the same between the opening and closing conditions as function of the activation operated by the actuating means 5.

By way of example, the switching means may be designed in a similar way to what provided for the safety switch disclosed in the application WO2013098788 in the name of the same Applicant, to which reference is made for greater detail.

In particular, the switching means and the actuating means 5 will be operatively associated respectively to a first communication element 6 and to a second communication element 7 adapted to remote communicate therebetween by means of a presence signal and to allow the switching means to discriminate the presence of the operating unit 3 close to the switching unit 2.

Moreover, the switching means of the electronic type will be programmed to receive information from the first communication element 6 and check if the mutual distance between the two elements 6, 7 is such as to fall in a predetermined range within which the first element 6 is able to discriminate the presence of the operating unit 3 and wherein it could consider the access closed in a safe manner.

The first communication element 6 is housed in an upper portion or head 8 of the switching unit 2 and is constituted by an antenna adapted to receive a frequency signal emitted by the second communication element 7.

Figures 3, 4:
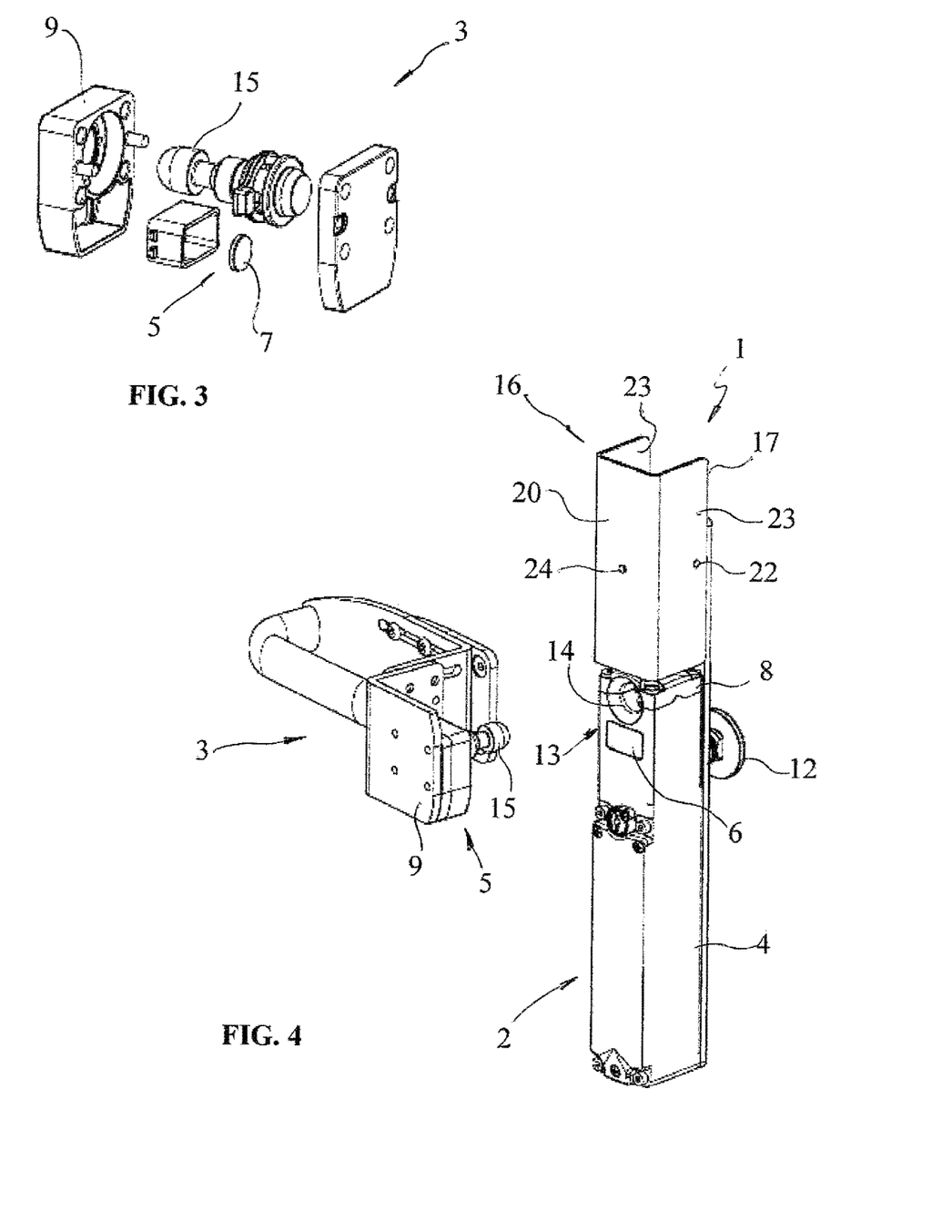
FIG. 3 is an exploded perspective view of a detail of a operating unit of the switch in a second preferred embodiment.
FIG. 4 is a perspective view of a switch of the invention in a second preferred embodiment and in condition of protection structure opened and lock-device in inactive position.

As visible from FIG. 3, the latter is housed inside a box-shaped shell 9 of the operating unit 3 and will consist of a transmitter adapted to send the presence signal to the antenna 6, which will transfer it to the switching means when the transmitter 7 is placed at a predetermined minimum distance, sufficient for considering the protection closed, so as to causing the closing of the power supply circuit of the plant.

Preferably, the transmitter 7 will be a transponder or the like adapted to send together with the presence signal also a unique identification code of the operating unit 3, in order to avoid that the switching means can be activated by actuators not responsible for presidium of the specific access.

However, it is understood that the proper features of the switching means may also be different and do not represent in itself a limitation on the scope of protection of the present invention.

The communication elements 6, 7 may also be designed in an identical or technically equivalent manner to the analogous elements present in the switch of above cited application WO2013098788, so as to define a Tag/RFID coupling.

According to the embodiments of the figures, preferred but not limiting, the switching unit 2 is optionally also provided with an intermediate module 10 interposed between the case 4 and the head 8 and provided with one or more emergency controls adapted to be hand-operated to drive the switching means in particular unsafe conditions.

The emergency command may be one of the key release devices 11, mushrooms emergency button 12 or other hand-operated release devices suitable to act directly on the switching means bypassing any possible electronic controls.

For example, the mushroom emergency button 12 may be positioned to project toward the inside of the protection so that it can be operated from the inside thereof to cause the stop of the plant in a dangerous situation, as in the case in which an operator remains within the safety perimeter following the closure of the protection with consequent starting of the plant. FIG. 4 shows a second embodiment of the switch 1 which differs from that of FIG. 1 mainly in that it comprises centering means 13 associated to both units 2, 3 and adapted to allow an at least partial alignment between the first and second communication element 6, 7 at the time of closure of access.

In particular, the centering means 13 comprise a centering hole 14 made in the head 8 of the switching unit 2, upperly to the antenna 6, and a centering pin 15 projecting from the box-like shell 9 of the operating unit 3, upperly to the transmitter 7.

The hole 14 and the centering pin 15 will have the task of aligning in a precise manner or at least partially the transmitter 7 and the antenna 6 in order to recover any play or misalignment between the relative parts products during assembly or use of the switch 1.

The operation and purposes of such centering means 13 are substantially similar to the analogous means described in the above cited EP2112674 and therefore will not be analyzed in more detail in the course of the present description.

Figure 2:
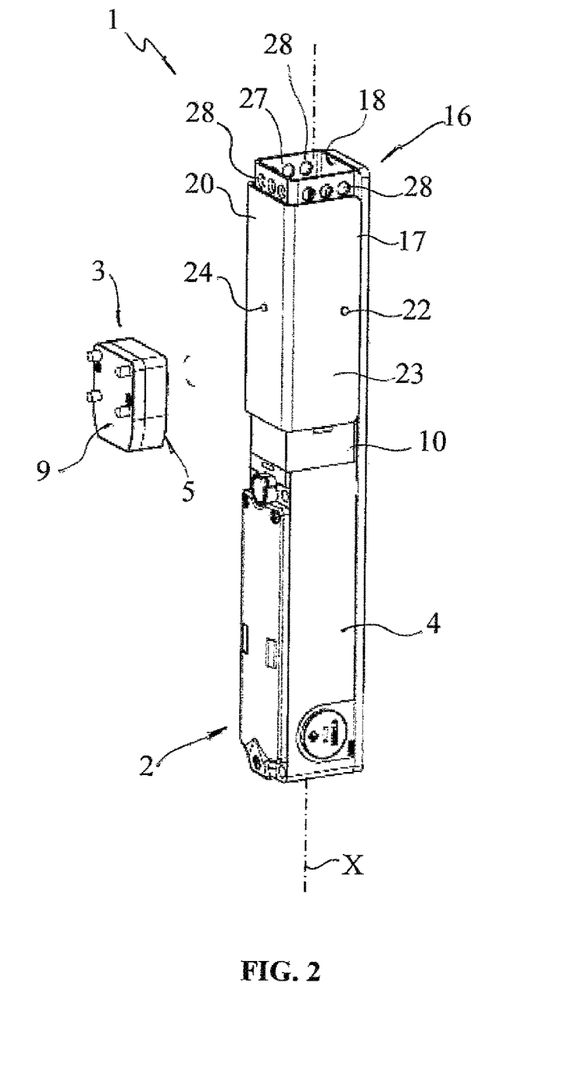
FIG. 2 is a perspective view of the switch of FIG. 1 with the lock-out device in the active position.
Figure 5:
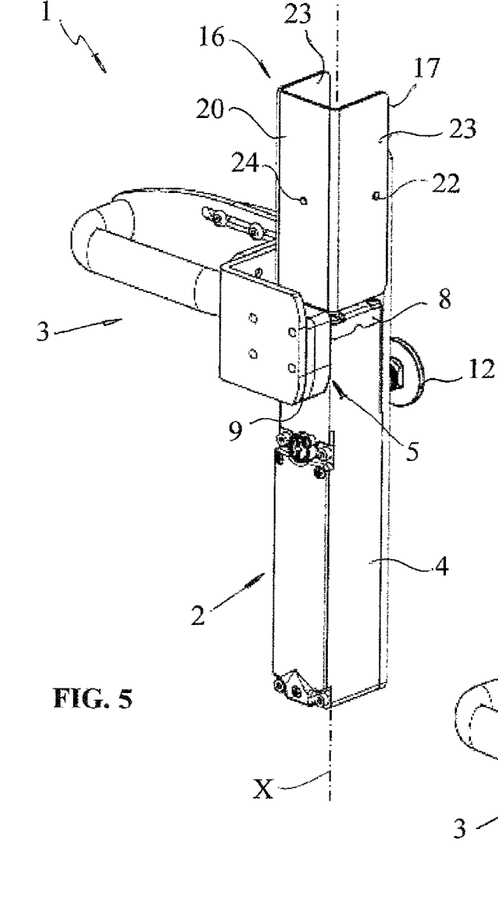
FIG. 5 is a perspective view of the switch of FIG. 4 with the protection structure closed.
Figure 6:
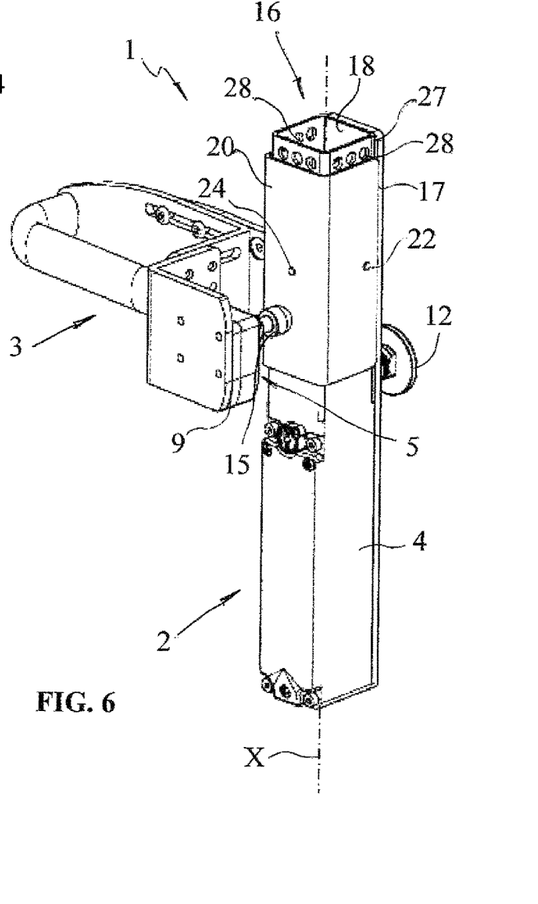
FIG. 6 is a perspective view of the switch of FIG. 4 in condition of protection structure opened and lock-device in active position.

In both configurations, the switch 1 also comprises a lock-out device 16 associated to the switching unit 2 and having a guard 17 movable between an inactive position, shown in FIG. 1 and in FIG. 4, adapted to allow the interaction between the switching means and the actuating means 5, as shown also in FIG. 5, and an active position in which this interaction is avoided, as shown instead in FIG. 2 and in FIG. 6.

The lock-out device 16 according to a first preferred embodiment, corresponding to that of the switch of FIGS. 1 and 4, is shown with greater detail in FIGS. 7 to 11.

Figure 7:
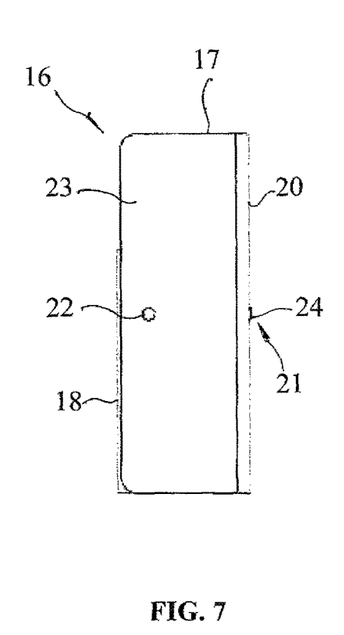
FIG. 7 is a side view of the lock-out device in inactive position.
Figure 8:
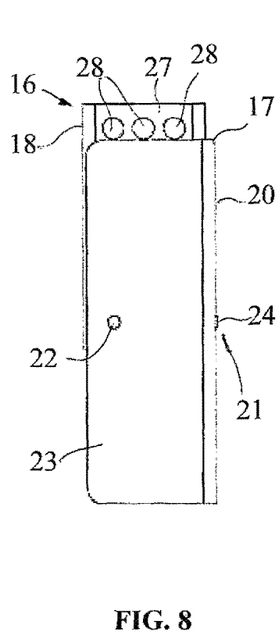
FIG. 8 is a side view of the lock-out device in active position.
Figure 9:
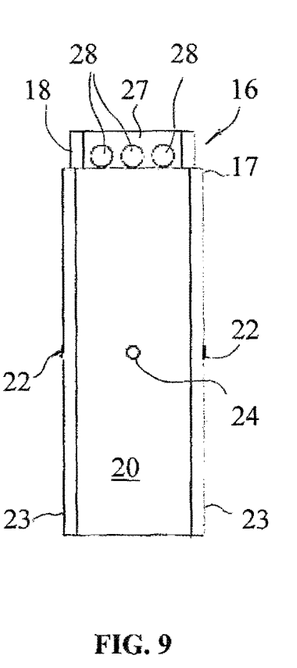
FIG. 9 is a front view of the lock-out device in active position.

From these figures it could be observed that the device 16 comprises a box-like support 18 adapted to be mounted superiorly to the switching unit 2 and having means 19 for guiding the movable guard 17 between the raised inactive position of FIG. 7 and the lowered active position of FIG. 8 and FIG. 9.

The passage of the guard 17 from the inactive position to the active one and vice versa will take for longitudinal sliding of the same along the guide means 19.

The movable guard 17 comprises or is defined by a shielding element 20 adapted to be interposed between the communication elements 6, 7 when the guard 17 is in the active position for blocking the transfer of the signal and prevent the closure of the switching means. Preferably, the shielding element 20 will be made at least partially of a metallic material or other material capable of absorbing at least part of the output signal from the transmitter 7.

In particular, the shielding element 20 is defined by a small panel suitably shaped to substantially completely cover in the active position at least three sides of the peripheral wall of the head 8 and therefore to surround the first communication element 6 on at least three sides.

On the contrary, in the inactive position the guard 17 will be fully raised along the guide means 19 to release completely the head 8 and not obstacle the interaction between the switching means and the actuating means 5.

Figure 10:
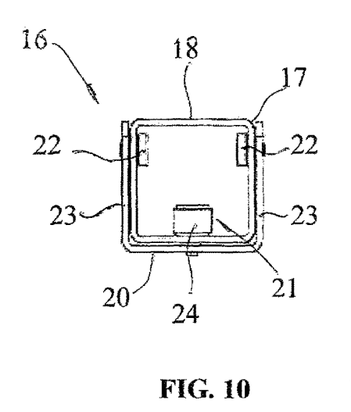
FIG. 10 is an elevated view of the lock-out device.

In FIG. 10 it could also observe the presence of elastic holding means 21 adapted to keep the movable guard 17 in the inactive position by exerting thereon a transverse force sufficient to prevent the automatic passage by gravity towards the active position upon opening the access of the protection structure.

The same holding means 21 will act on the movable guard 17, also at the time of the opposite passage toward the raised inactive position, requiring a though small effort for such a movement.

Generally, the holding means 21 may comprise one or more elastic elements which act on corresponding faces of the movable guard 17 to hold it on the support 18.

Figure 11:
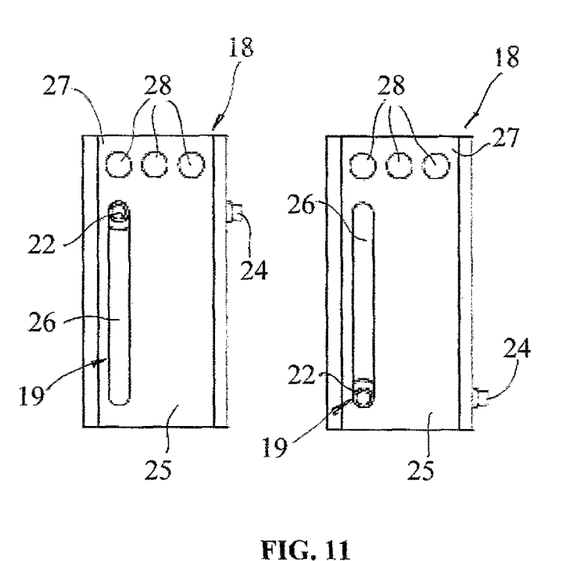
FIG. 11 shows side views of a detail o the lock-out device in inactive position and in active position.

By way of example, as shown in the same figures from 7 to 11, the guide means 19 may comprise two lateral pins 22 integral with respective sides 23 of the movable guard 17 and slidable within respective slots 26 formed on the corresponding faces of the side wall 25 of the support 8, shown in FIG. 11.

The holding means 21 may comprise a single elastic element 24 frontally acting on the shielding element 20, although more elastic elements may be also provided also, possibly arranged on one or both the sides 23.

From the same FIGS. 8 to 11 it could be observed that the box-like support 18 is also provided along its upper edge 27 with a plurality of holes 28 distributed in such a way as to be accessible from the outside only when the movable guard 17 is in the active position.

In particular, the axial extension of the shielding element 20 and the distribution of the holes 28 on the support 18 are such that the holes 18 are completely obstructed when the shielding element 20 is in the inactive position and at least partially obstructed in correspondence of any one intermediate position of the shielding element 20 along its axial stroke, so as not to be still accessible.

Preferably, the holes 28 will be made on one or more of the three sides of the side wall 25 of the support 18 facing the sides of the movable guard 17.

The holes 28 have the object of allowing the insertion of appropriate locking means 29 for the movable guard 17 adapted to prevent, when inserted, its return from the active position to the inactive position.

Figure 12:
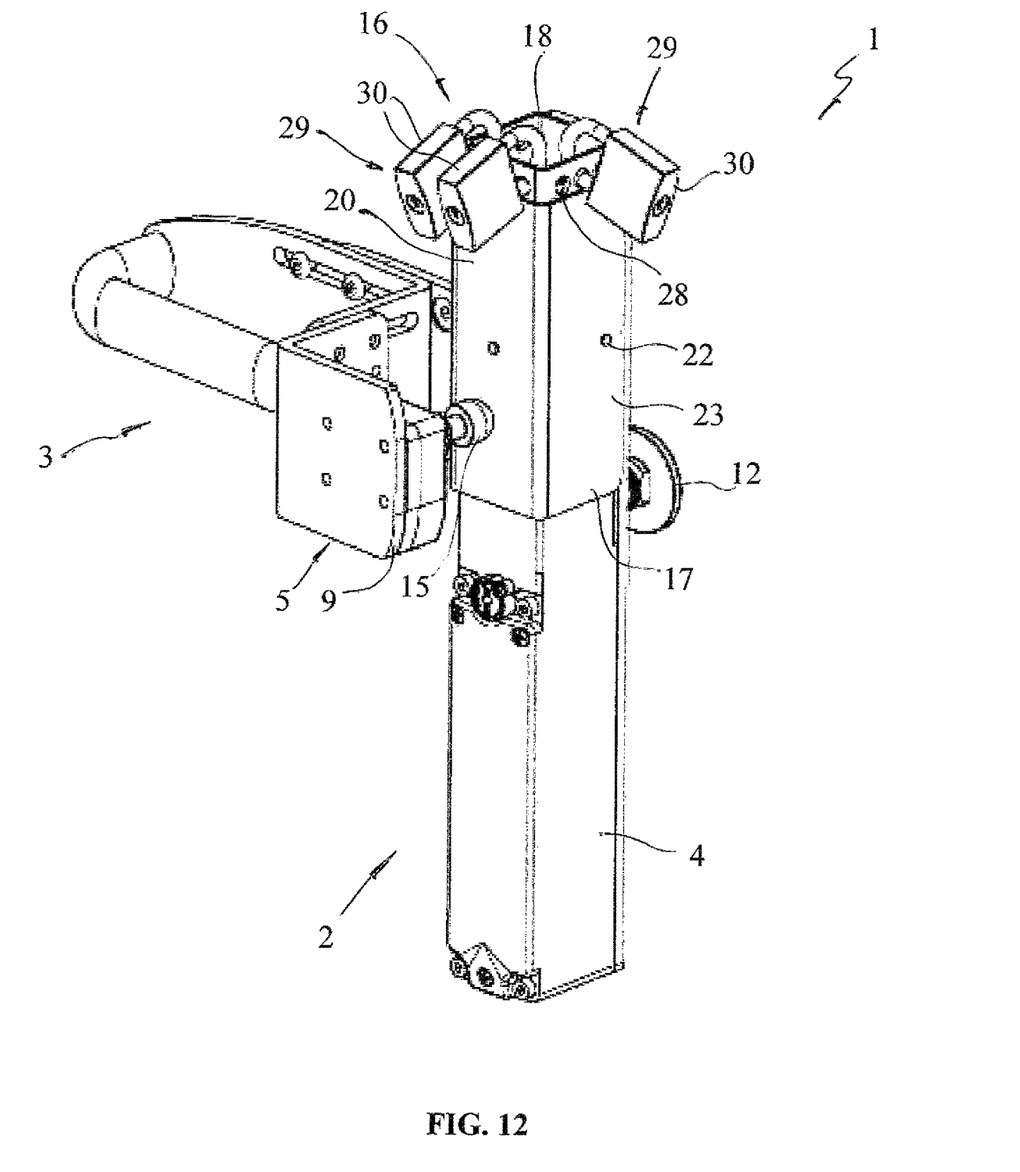
FIG. 12 is a perspective view of the switch of FIG. 4 with the protection opened and the lock-out device in active position and wherein the locking means are inserted.

As shown in FIG. 12, the locking means 29 may be constituted by one or more locks 30 of the key and/or combination type or similar closure systems, such as seals and twist ties.

Figure 13:
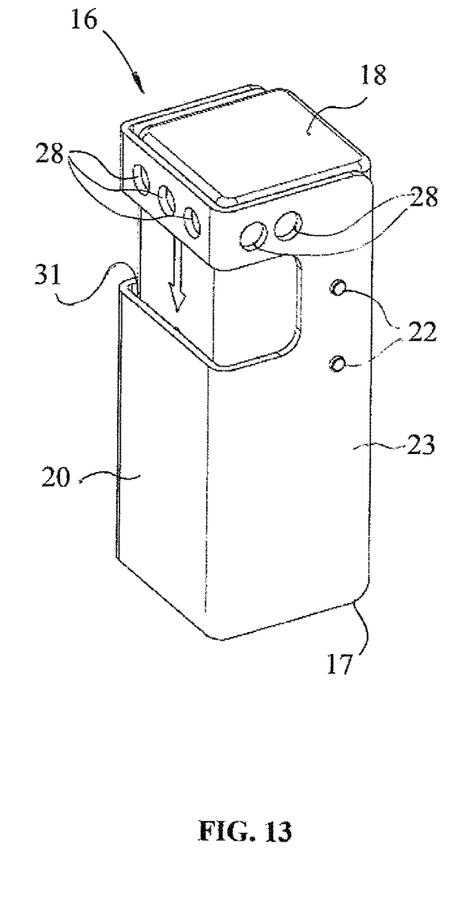
FIG. 13 is a perspective view of the lock-out device in a second preferred embodiment and in inactive position.

FIG. 13 shows a second embodiment for a lock-out device 16 adapted to be applied to a switch 1 according to the invention.

Figure 14:
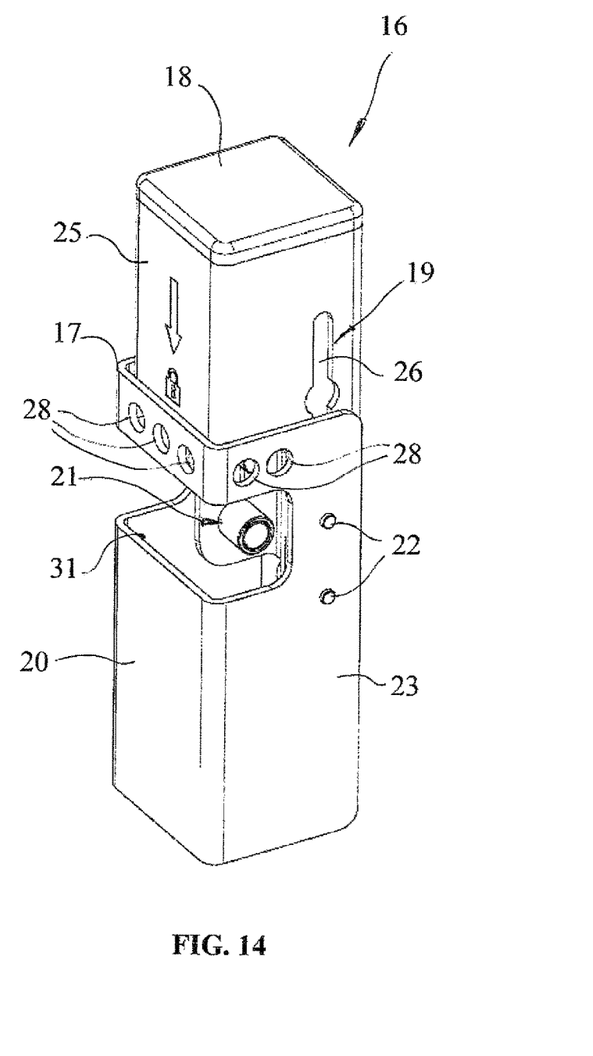
FIG. 14 is a perspective view of the lock-out device of FIG. 13 in active position.

This embodiments differs from that disclosed above essentially by the fact that the holes 28 for the insertion of the locking means 29 are made on the movable guard 17 to be accessible through a central slot 31 of the same that will be free, as well as the same holes 28, only when the guard 17 is in the lowered active position of FIG. 14.

Similarly to the previous configuration, the axial extension of the shielding element 20 and the distribution of the holes 28 on the support 18 are such that the holes 18 are completely obstructed when the shielding element 20 is in the inactive position and at least partially obstructed at any intermediate position of the shielding element 20 along its axial stroke, so as not to be still accessible.

Figure 15:
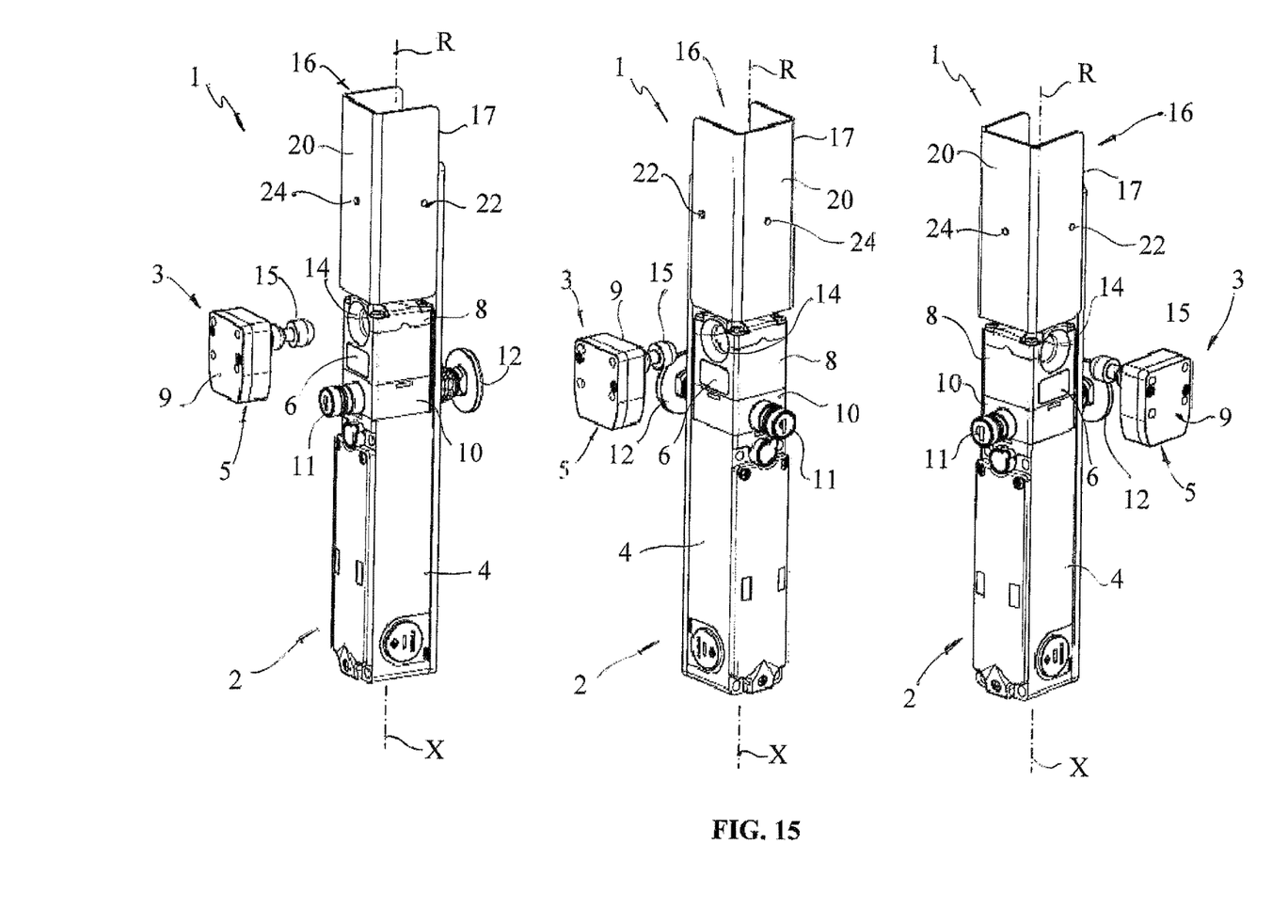
FIG. 15 is a perspective view of a safety switch in a third preferred embodiment with the lock-out device of FIG. 7 in inactive position and wherein the switching unit and the operating unit are oriented according three different mutual angulations.

FIG. 15 shows a third embodiment for the switch 1 substantially similar to that of FIG. 4 and from which it differs, as well as for the presence of two emergency controls 11, 12, for the fact that both the head 8 and the intermediate module 10 of the switch unit 2 are mounted on the case 4 so as to rotate about an axis of rotation R substantially parallel to the longitudinal axis X.

The head 8 and the intermediate module 10 may rotate separately from each other and the rotation of the head 8 will have mainly the object to vary the angular orientation of the first communication element 6, possibly in a manner integral with the centering hole 14, to keep it always facing the second communication element 7, the position of which depends instead on the open mode of the movable part.

Figure 16:
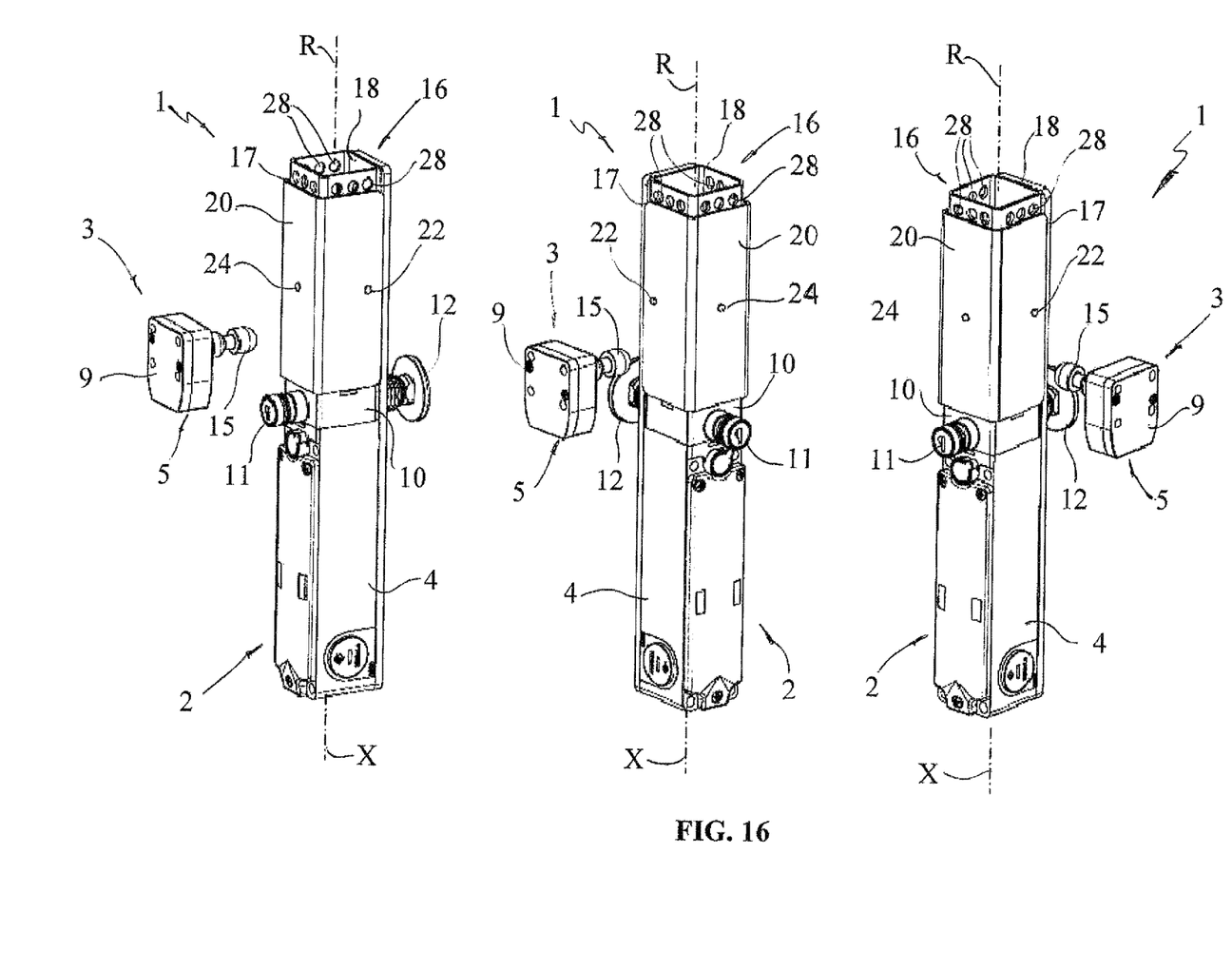
FIG. 16 shows perspective views of the safety switch of FIG. 15 with the lock-out device in active position.
Figure 17:
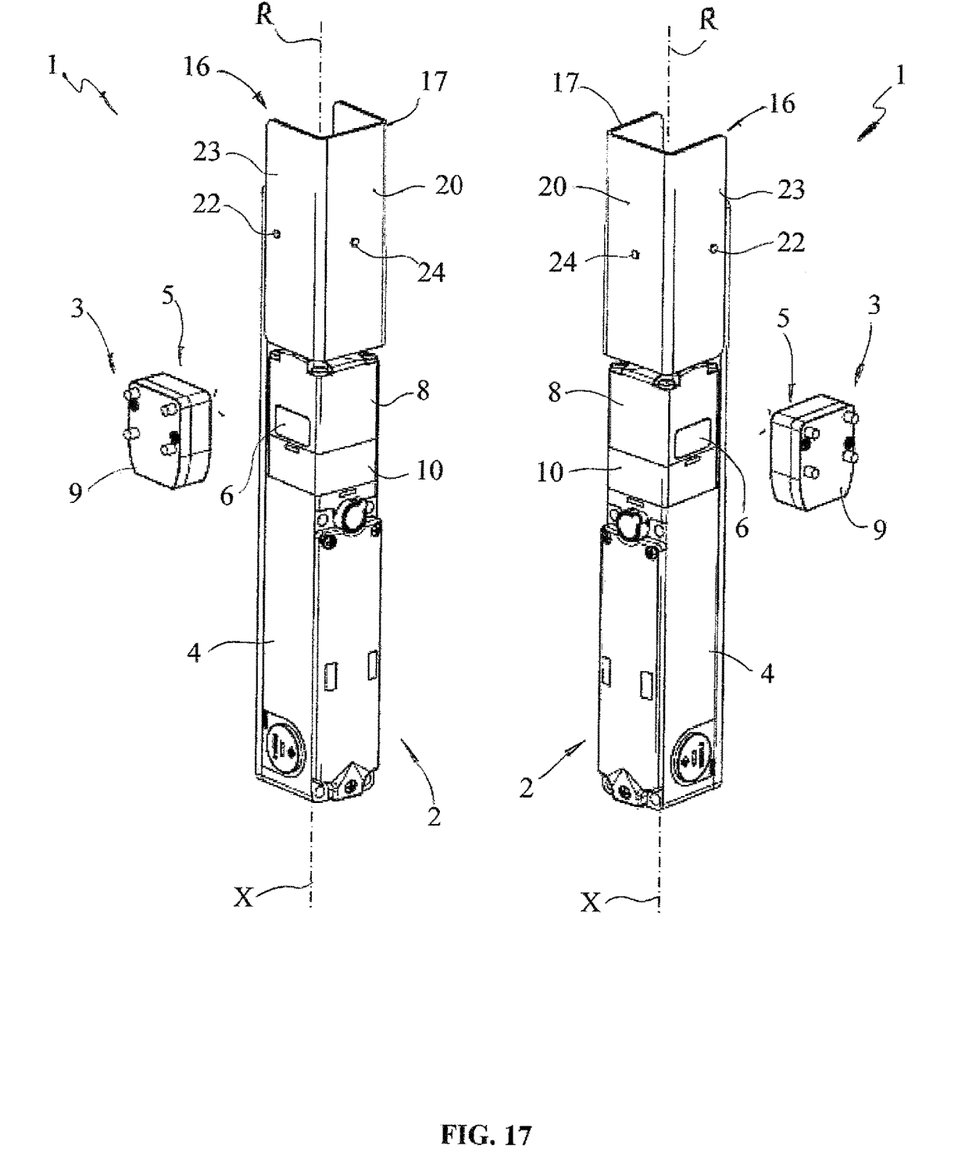
FIG. 17 shows two perspective views of the safety switch of FIG. 1 with the lock-out device in the inactive position and wherein the switching unit and the operating unit are oriented according two different mutual angulations.

FIG. 16 shows the same switch 1 of FIG. 15 with the lock-out device 16 inserted but not locked. FIG. 17 shows the switch 1 of FIG. 1 according two additional assembly modes in which the head 8 is rotated by 90° depending on the different directions of approach of the operating unit 3.

Figure 18:
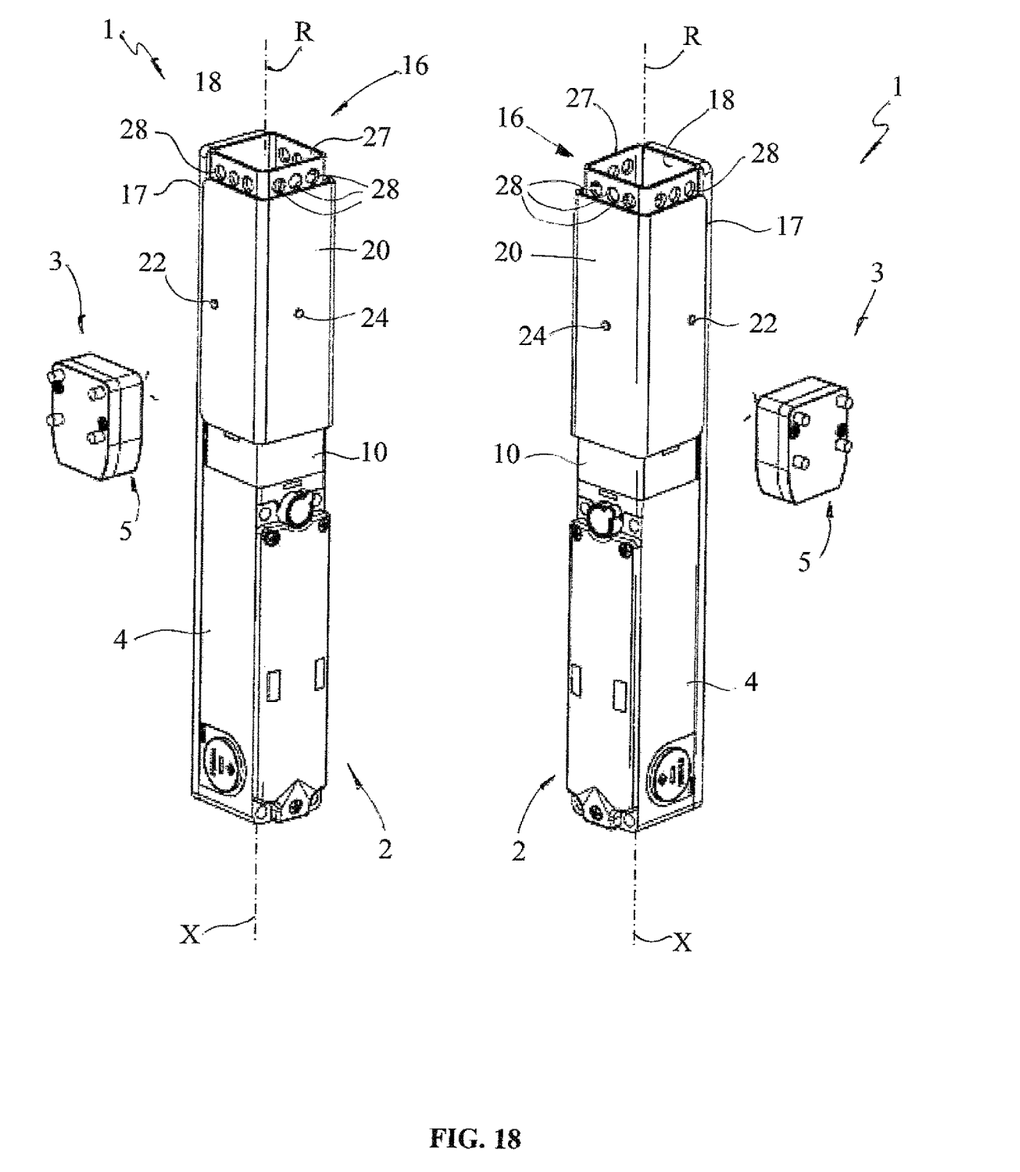
FIG. 18 shows the two perspective view of the safety switch of FIG. 17 with the lock-out device in active position.

Finally FIG. 18 shows a switch 1 according to the same configurations shown in FIG. 17 and in which the movable guard 17 is in the active position. From these figures it could be observed that also in this case, thanks to the peculiar configuration of the lock-out device 16, the first element 6 and the second communication element 7 may be arranged at the above minimum distance that, when the lock-out device 16 is in the inactive position, it would be sufficient to allow mutual communication, which in this case will instead be disabled by the presence of the movable guard 17.

Not least, the switch 1 according to the present invention may be provided with further devices and auxiliary means, not shown since of known type and not limitative of the present invention, such as a lock mechanism housed in the switching unit 2 and adapted to operate on the actuating means 5 to hold/drop them selectively with respect to the switching unit 2 after the opening/closing of the power supply circuit by the switching means.

In turn, the intermediate module 10 may house releasing means hand-operable from the outside, for example via the manual release 11, and operatively coupled to the locking mechanism to perform the unlocking of the operating unit 3 with a predetermined time delay with respect to the switching of the power supply circuit by the switching means.

From above it appears evident that the switch according to the invention reaches the intended objects and in particular that of providing a lock-out device suitable to be used with a safety switch with electronic drive that ensures high reliability in any operating condition.

The switch according to the invention is susceptible to numerous modifications and variations, all falling within the inventive concept expressed in the accompanying claims. All the details may be replaced with other technically equivalent elements, and the materials may be different according to requirements, without departing from the scope of the present invention.

The invention claimed is:

1. A safety switch with a lock-out device, adapted to be mounted at an access of a perimeter protection structure of industrial machines or plants, comprising:
   a switching unit (2) adapted to be anchored to a fixed part of the structure and provided with switching contacts adapted to be operatively connected with at least one power supply circuit of the plant to be controlled for the opening/closing thereof;
   an operating unit (3) adapted to be anchored to a movable part of the structure and having an actuating unit (5) interacting with said switching contacts upon the closing of the movable part on the fixed part to enable the closing of the power supply circuit;
   a lock-out device (16) associated with said switching unit (2) and having a guard (17) movable between an inactive position, wherein the interaction between said switching contacts and said actuating unit (5) is allowed and an active position wherein said interaction is avoided;

wherein said switching contacts and said actuating unit (5) are electronic and are respectively associated with a first communication element (6) and a second communication element (7) remotely communicating therebetween by means of a presence signal to allow said switching contacts to discriminate the presence of said operating unit (3) close to said switching unit (2);

wherein said movable guard (17) comprises a shielding element (20) interposing itself between said communication elements (6, 7) when said guard (17) is into said active position to avoid the transmission of said signal and the closing of said switching contacts, said operating unit (3) allowing said first communication element (6) and said second communication element (7) to move into a position facing each other both when said movable guard (17) is in said active position and when is in said inactive position for closing the access to be controlled also with said movable guard (17) in said active position;

wherein said first communication element (6) and said second communication element (7) communicate therebetween only after reaching a predetermined minimum distance sufficient for considering the protection closed, at which distance said first communication element (6) discriminates the presence of said operating unit (3) close to said switching unit (2); and wherein said lock-out device (16) allows said operating unit (3) to place said second communication element (7) at said minimum distance from the first communication element (6) also with the movable guard (17) in said active position.

2. A switch as claimed in claim 1, wherein said lock-out device (16) comprises a support (18) adapted to be mounted upperly to said switching unit (2) and having a guide (19) for said movable guard (17).

3. A switch as claimed in claim 2, wherein said lock-out device (16) comprises locking means (29) for said movable guard (17) adapted to avoid its returning from said active position back toward said inactive position.

4. A switch as claimed in claim 3, wherein at least one of said movable guard (17) and said support (18) comprises one or more through-holes or passages (28) for inserting corresponding locking means (29), said through-holes (28) being arranged to be accessible by said locking means (29) exclusively with said movable guard (17) in said inactive position and being at least partially obstructed when said movable guard (17) is into said inactive position or in any intermediate position between said inactive position and said active position.

5. A switch as claimed in claim 1, wherein said lock-out device (16) comprises holding means (21) for said movable guard (17) adapted to selectively operate thereon for holding it in said inactive position or allowing the passage toward said active position.

6. A switch as claimed in claim 5, wherein said holding means (21) are adapted to allow said actuating unit (5) to bring said second communication element (7) in a same position substantially facing said first communication element (6) both when said movable guard (17) is in said active position and when is in said inactive position.

7. A switch as claimed in claim 6, wherein said holding means (21) are elastic and adapted to exert on said movable guard (17) a force sufficient to avoid its automatic passage by gravity toward said active position upon the opening of the access of the protection structure.

8. A switch as claimed in claim 1, comprising centering means (13) adapted to allow an at least partial alignment between said first (6) and said second communication element (7) upon the closing of the access of the protective structure.

9. A switch as claimed in claim 8, wherein said centering means (13) comprise a centering hole (14) formed in a portion or head (8) of said switching unit (2) housing said first communication element (6) and a centering pin (15) projecting from a portion (9) of said operating unit (3) housing said second communication element (7).

10. A switch as claimed in claim 9, wherein said switching unit (2) comprises a lower case (4) defining a longitudinal axis (X) and housing said switching contacts, said head (8) being mounted upperly to said case (4) and being susceptible of rotating about a rotation axis (R) substantially parallel to said longitudinal axis (X) to vary the angular orientation of said first communication element (6), integrally with said centering hole (14).

11. A switch as claimed in claim 2, wherein said movable guard (17) is longitudinally slidable between a raised inactive position and a lowered active position wherein said shielding element (20) cover in a substantially complete manner at least three faces of the peripheral wall of said head (8).

12. A switch as claimed in claim 1, wherein said shielding element (20) is shaped to envelope said first communication element (2) at least along three sides.

* * * * *